United States Patent
Saeki et al.

(10) Patent No.: US 11,994,159 B2
(45) Date of Patent: May 28, 2024

(54) RESIN PANEL, STRUCTURE, AND METHOD FOR MANUFACTURING SAME

(71) Applicant: KYORAKU CO., LTD., Kyoto (JP)

(72) Inventors: Kazuhiko Saeki, Nagoya (JP); Sho Nakajima, Yamato (JP); Ryuichi Ishida, Tokyo (JP)

(73) Assignee: KYORAKU CO., LTD., Kyoto (JP)

( * ) Notice: Subject to any disclaimer, the term of this patent is extended or adjusted under 35 U.S.C. 154(b) by 517 days.

(21) Appl. No.: 17/289,881

(22) PCT Filed: Oct. 24, 2019

(86) PCT No.: PCT/JP2019/041763
§ 371 (c)(1),
(2) Date: Apr. 29, 2021

(87) PCT Pub. No.: WO2020/110535
PCT Pub. Date: Jun. 4, 2020

(65) Prior Publication Data
US 2021/0404495 A1    Dec. 30, 2021

(30) Foreign Application Priority Data

Nov. 26, 2018   (JP) .................................. 2018-220498

(51) Int. Cl.
*F16B 5/04*      (2006.01)
*B60R 5/04*      (2006.01)
*F16B 19/10*     (2006.01)

(52) U.S. Cl.
CPC .................. *F16B 5/04* (2013.01); *B60R 5/04* (2013.01); *F16B 19/10* (2013.01); *Y10T 29/49943* (2015.01)

(58) Field of Classification Search
CPC ........ F16B 5/04; F16B 19/10; F16B 19/1054; B60R 5/04; B60R 13/011; Y10T 29/49943
See application file for complete search history.

(56) References Cited

U.S. PATENT DOCUMENTS 9,726,213 B2 * 8/2017 Yuzawa ............... F16B 19/1054
2015/0308480 A1 * 10/2015 Yuzawa .................... F16B 5/04
411/43
2017/0217591 A1 * 8/2017 Hirose ................ F16B 19/1081

FOREIGN PATENT DOCUMENTS

JP      1988-190609 U    12/1988
JP      H04-36664 Y2     8/1992
(Continued)

OTHER PUBLICATIONS

JP H0436664; English Machine Translation; Aug. 28, 1992, pp. 1-2 (Year: 1992).*
(Continued)

*Primary Examiner* — Bayan Salone
(74) *Attorney, Agent, or Firm* — Maier & Maier, PLLC

(57) ABSTRACT

An objective of the present invention is to attach an attached member to a resin panel with less man-hours. According to the present invention, provided is a manufacturing method of a resin panel including an attaching step. In the attaching step, an attached member is attached to a surface of a resin molded body by arranging a rivet body provided on a blind rivet in a concave portion formed on the surface, tearing a part of the rivet body to enlarge a diameter of the part of the rivet body, and allowing the part of the rivet body to penetrate a wall surface of the concave portion.

5 Claims, 14 Drawing Sheets

(56) References Cited

FOREIGN PATENT DOCUMENTS

| JP | H0436664 Y2 | * | 8/1992 | |
|---|---|---|---|---|
| JP | H8-159128 A | | 6/1996 | |
| JP | 2010-052389 A | | 3/2010 | |
| JP | 2010052389 A | * | 3/2010 | |
| JP | 2015-168049 A | | 9/2015 | |
| JP | 2015168049 A | * | 9/2015 | |
| JP | 2015-209854 A | | 11/2015 | |
| JP | 2015209854 A | * | 11/2015 | .......... F16B 19/1054 |
| JP | 2018-043622 A | | 3/2018 | |
| JP | 2018043622 A | * | 3/2018 | |
| WO | 2015162827 A1 | | 10/2015 | |
| WO | WO-2015162827 A1 | * | 10/2015 | ............. B64D 11/02 |

OTHER PUBLICATIONS

Office Action issued on Jul. 29, 2022 in connection with corresponding Chinese Patent Application No. 201980067470.0 (21 pages including English-language translation).
International Search Report issued on Dec. 3, 2019 of corresponding International Application No. PCT/ JP2019/041763; 9 pgs.

* cited by examiner

RESIN PANEL, STRUCTURE, AND METHOD FOR MANUFACTURING SAME

TECHNICAL FIELD

The present invention relates to a resin panel and a structure comprising a resin molded body. The resin panel and the structure of the present invention can be used, for example, as a luggage compartment board of a vehicle.

BACKGROUND ART (First Viewpoint)

Regarding a resin panel used for a luggage compartment board of a vehicle (also referred to as a deck board or a luggage board), for example, Patent Literature 1 discloses a technique for attaching a mounting bracket (attached member) to a deck board using a blind rivet.

(Second Viewpoint)

Regarding a structure (resin panel) using a resin molded body used for a luggage compartment board of a vehicle, for example, Patent Literature 2 discloses a structure into which a reinforcing member is inserted.

CITATION LIST

Patent Literature

[Patent Literature 1] JP-A-2015-209854
[Patent Literature 2] JP-A-2010-52389

SUMMARY OF INVENTION

Technical Problem (First Viewpoint)

However, in the resin panel described in Patent Literature 1, it is necessary to form a hole on the resin panel for inserting the blind rivet. Further, since cutting chips are generated when the insertion hole is formed, it is necessary to remove the cutting chips.

The present invention has been made in view of such circumstances, and an objective thereof is to attach an attached member to a resin panel with less man-hours.

(Second Viewpoint)

When manufacturing such a structure, an attached member, such as a fixture, may be attached to an outer surface of the resin molded body. However, it is difficult to secure the strength when the attached member is fixed to the outer surface of the resin molded body.

The present invention has been made in view of such circumstances, and an objective thereof is to securely attach the attached member to the outer surface of the resin molded body.

Solution to Problem (First Viewpoint)

According to the present invention, provided is a manufacturing method of a resin panel, comprising an attaching step, wherein, in the attaching step, an attached member is attached to a surface of a resin molded body by arranging a rivet body provided on a blind rivet in a concave portion formed on the surface, tearing a part of the rivet body to enlarge a diameter of the part of the rivet body, and allowing the part of the rivet body to penetrate a wall surface of the concave portion.

In the configuration of the present invention, the attached member is attached to the resin molded body by arranging the rivet body provided on the blind rivet in the concave portion formed on the surface of the resin molded body, tearing the rivet body to enlarge a diameter of the rivet body, and allowing the part of the rivet body to penetrate the wall surface of the concave portion. Therefore, it is not necessary to form a hole through which the blind rivet is inserted, on the resin molded body. Consequently, cutting chips are not generated, eliminating the need for the work of removing the cutting chips, and thus man-hours for the work can be reduced.

Hereinafter, various embodiments of the present invention will be described. The embodiments described hereinafter can be combined with each other.

Preferably, the concave portion has a truncated cone shape; the wall surface is tapered to have a smaller diameter toward a bottom surface; and in the attaching step, the attached member is attached to the surface by tearing the part of the rivet body to enlarge the diameter of the part of the rivet body and allowing the part of the rivet body to penetrate the wall surface in a tapered shape.

Preferably, the attaching step further comprises a concave-portion formation step of forming the concave portion by pressing the blind rivet against a convex portion formed on the surface and inverting the convex portion.

Preferably, the concave portion is formed on the surface of the resin molded body to have a non-circular shape in a plan view.

In another embodiment of the present invention, provided is a resin panel configured by attaching an attached member to a resin molded body, wherein the attached member is attached to the resin molded body by a blind rivet; a part of a rivet body provided on the blind rivet is arranged in a concave portion provided on a surface of the resin molded body; and the blind rivet is configured to attach the attached member to the resin molded body in a state where the part of the rivet body is torn to enlarge a diameter of the part of the rivet body and penetrates a wall surface of the concave portion.

Preferably, the concave portion has a non-circular shape in a plan view.

(Second Viewpoint)

According to the present invention, provided is a manufacturing method of a structure, comprising: a molding step; and an attaching step, wherein the structure comprises a resin molded body, a reinforcing material, and a fixture; in the molding step, the resin molded body comprising a hollow portion is molded from a resin sheet; and in the attaching step, an attached member is attached to an outer surface of the resin molded body by the fixture to jointly fasten the resin molded body and the reinforcing material arranged in the hollow portion.

In the configuration of the present invention, the attached member is attached to the outer surface of the resin molded body by jointly fastening the resin molded body and the reinforcing material arranged in the hollow portion. Consequently, the strength can be secured when attaching the attached member, and the attached member can be securely attached to the resin molded body.

Hereinafter, various embodiments of the present invention will be described.

Preferably, the method further comprises a discharging step; in the attaching step; a through hole is formed by cutting the resin molded body and the reinforcing material, and the resin molded body and the reinforcing material are jointly fastened by inserting the fixture through the through hole; and in the discharging step, a cutting chip generated during cutting is discharged from the hollow portion along a longitudinal direction of the reinforcing material.

Preferably, the method further comprises an opening step and an insertion step; in the opening step, an opening communicating with the hollow portion is formed on the resin molded body; in the insertion step, the reinforcing material is inserted from the opening into the hollow portion; and in the discharging step, the cutting chip is discharged through the opening.

Preferably, in the insertion step, the reinforcing material having a tubular shape is inserted.

In another embodiment of the present invention, provided is a structure, comprising:
 a resin molded body; a reinforcing material; and a fixture, wherein the resin molded body comprises a hollow portion; the reinforcing material has an elongated shape and is arranged in the hollow portion; an attached member is attached to an outer surface of the resin molded body by the fixture; and the fixture is configured to jointly fasten the resin molded body and the reinforcing material.

DESCRIPTION OF EMBODIMENTS

Hereinafter, various embodiments of the present invention will be described. Various features described in the following embodiments can be combined with each other. In addition, an invention can be established independently for each of the features.

Embodiments of First Viewpoint

1. First Embodiment 1-1. Configuration of Resin Panel 10

Figure 1A:
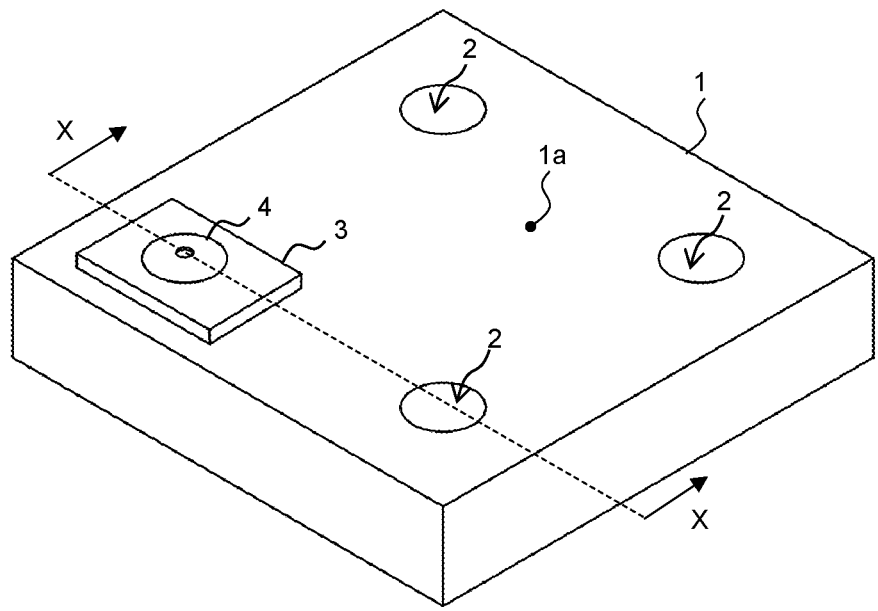
FIG. 1A is a perspective view of a resin panel 10 of a first embodiment of the first viewpoint of the present invention.

As shown in FIG. 1A, a resin panel 10 of a first embodiment of the present invention is formed in a rectangular shape in a plan view. In the resin panel 10, a plurality of bottomed concave portions 2 is formed on a main body 1, which is a resin molded body, for reinforcement in the vertical direction. The concave portion 2 is formed in a circular shape in a plan view and is tapered to have a smaller diameter toward a bottom portion. A wall surface 2a (see FIG. 1B) of the concave portion 2 is molded to have a smaller thickness than the thickness of a surface 1a of the main body 1.

An attached member 3 is attached to the resin panel 10 by a blind rivet 4. Examples of the attached member 3 include a metal mounting bracket, and a strap made of leather or non-woven fabric.

Figure 1B:
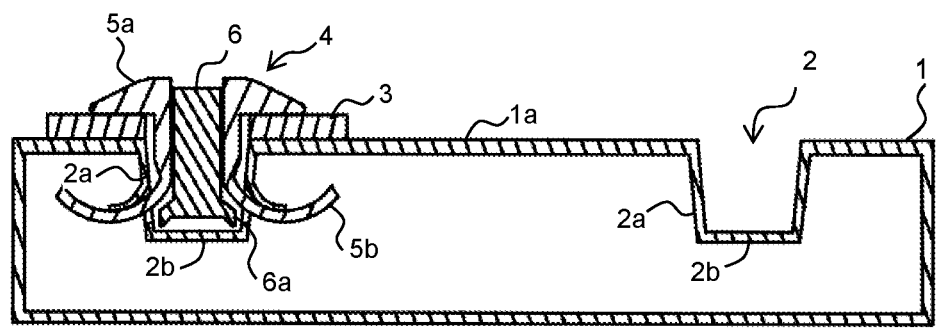
FIG. 1B is a cross-sectional view taken along a line X-X in FIG. 1A.

As shown in FIG. 1B, the main body 1 is formed in a hollow shape. The blind rivet 4 includes a columnar shaft 6, a flange-shaped rivet head 5a inserted through the shaft 6, and a sleeve-shaped rivet body 5b. The rivet head 5a and the rivet body 5b are connected to each other.

A part of the rivet body 5b included in the blind rivet 4 is arranged in the concave portion 2. The blind rivet 4 is configured to attach the attached member 3 to the main body 1 in a state where a part of the rivet body 5b is torn and its diameter is enlarged to penetrate the wall surface 2a of the concave portion 2.

The shaft 6 includes a tip portion 6a on a side of the main body 1. The diameter of the tip portion 6a is enlarged so that its length in the radial direction is equal to or greater than the length of the rivet body 5b in the radial direction.

1-2. Configuration of Molding Machine 60

Figure 2:
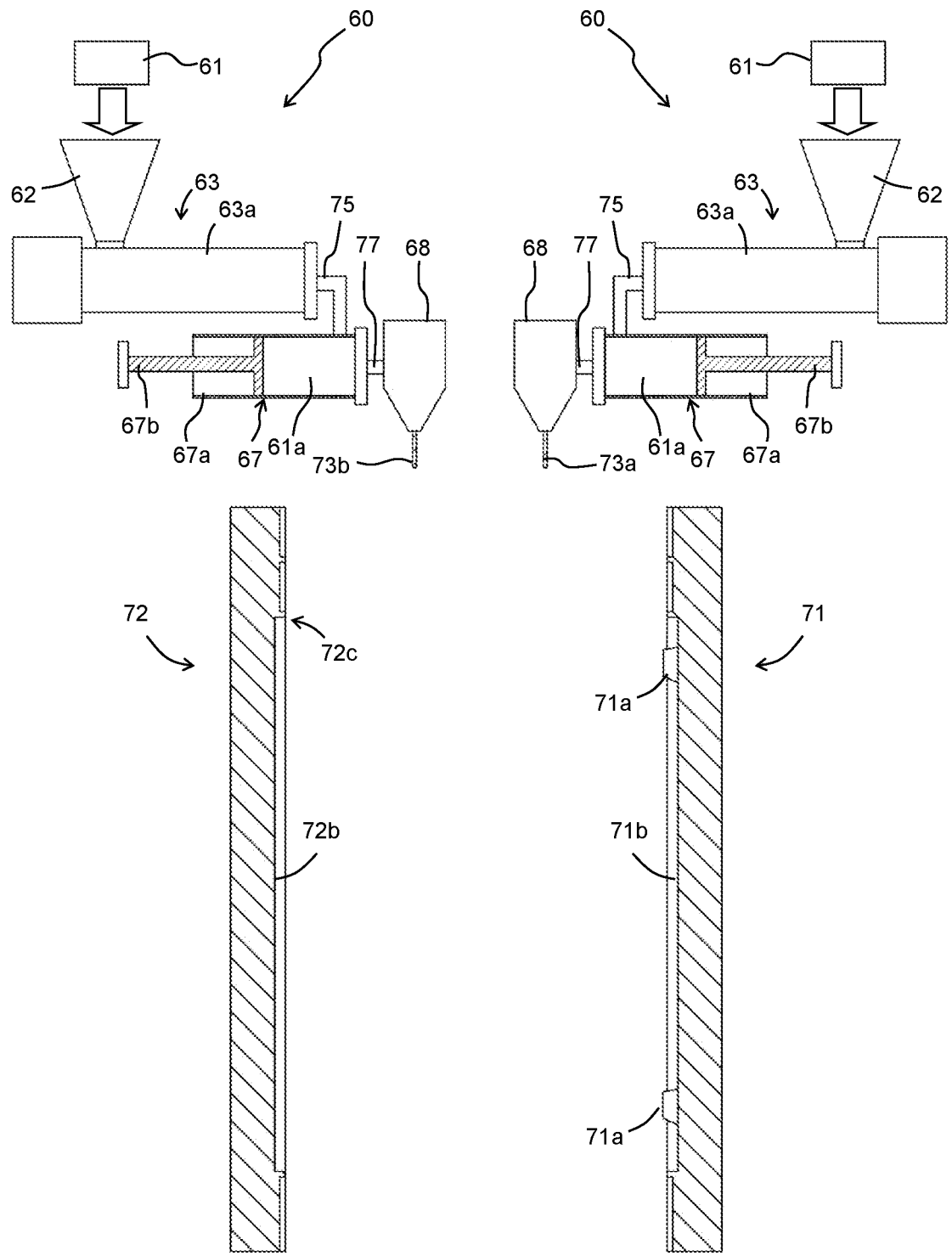
FIG. 2 shows a molding machine 60 that can be used for manufacturing the resin panel 10.

A molding machine 60 for molding the main body 1 will be described with reference to FIG. 2. As shown in FIG. 2, the molding machine 60 includes a hopper 62, an extruder 63, an accumulator 67, and a T-die 68. The extruder 63 and the accumulator 67 are connected to each other via a connecting tube 75. The accumulator 67 and the T-die 68 are connected to each other via a connecting tube 77. Hereinafter, each configuration will be described in detail.

Hopper 62, Extruder 63

The hopper 62 is used to feed raw material resin 61 into a cylinder 63a of the extruder 63. The form of the raw material resin 61 is not particularly limited but is usually in the form of pellets. The raw material resin is thermoplastic resin, such as polyolefin, and examples of polyolefin include low density polyethylene, linear low density polyethylene, high density polyethylene, polypropylene, ethylene-propylene copolymer, and mixtures thereof. The raw material resin 61 is fed from the hopper 62 into the cylinder 63a and is then heated and melted in the cylinder 63a to become molten resin. Further, the molten resin is conveyed toward an end of the cylinder 63a by the rotation of a screw arranged in the cylinder 63a. The screw is arranged in the cylinder 63a and conveys the molten resin while kneading the molten resin by its rotation. A gear device is provided at a proximal end of the screw, and the screw is driven and rotated by the gear device.

Accumulator 67, T-Die 68

The raw material resin is extruded from a resin extrusion port of the cylinder 63a and is injected into the accumulator 67 through the connecting tube 75. The accumulator 67 includes a cylinder 67a and a piston 67b slidable inside the cylinder 67a, and molten resin 61a can be stored in the cylinder 67a. The piston 67b is moved after a predetermined amount of the molten resin 61a is stored in the cylinder 67a, so that the molten resin 61a is extruded, through the connecting tube 77, and hung down from a slit provided in the T-die 68 to form first and second resin sheets 73a, 73b in a molten state.

Molds 71, 72

The resin sheets 73a, 73b are guided between molds 71, 72. The molds 71, 72 can be divided on a parting surface where they come into contact with each other when the molds are closed, and the main body 1 is formed by the molds 71, 72. As will be described in detail later, the main body 1 is molded using a pair of divisible molds 71, 72 in a manufacturing step of the resin panel 10.

The mold 71 is provided with a large number of reduced pressure suction holes (not shown), so that the resin sheet 73a can be suctioned under reduced pressure to be formed in a shape along an inner surface 71b of a cavity of the mold 71. A pinch-off portion 71c is provided to surround the cavity. Truncated cone-shaped protrusions 71a are formed on the mold 71 to form the concave portions 2 on the main body 1.

The mold 72 is provided with a large number of reduced pressure suction holes (not shown), so that the resin sheet 73b can be suctioned under reduced pressure to be formed in a shape along an inner surface 72b of a cavity of the mold 72. A pinch-off portion 72c is provided to surround the cavity.

1-3. Manufacturing Method of Resin Panel 10

<Details of Manufacturing Step>

A manufacturing method of the resin panel 10 will be described with reference to FIG. 3 to FIG. 4C. The manufacturing method includes, for example, a hanging step, a shaping step, a mold closing step, and an attaching step.

1-3-1. Hanging Step

Figure 3:
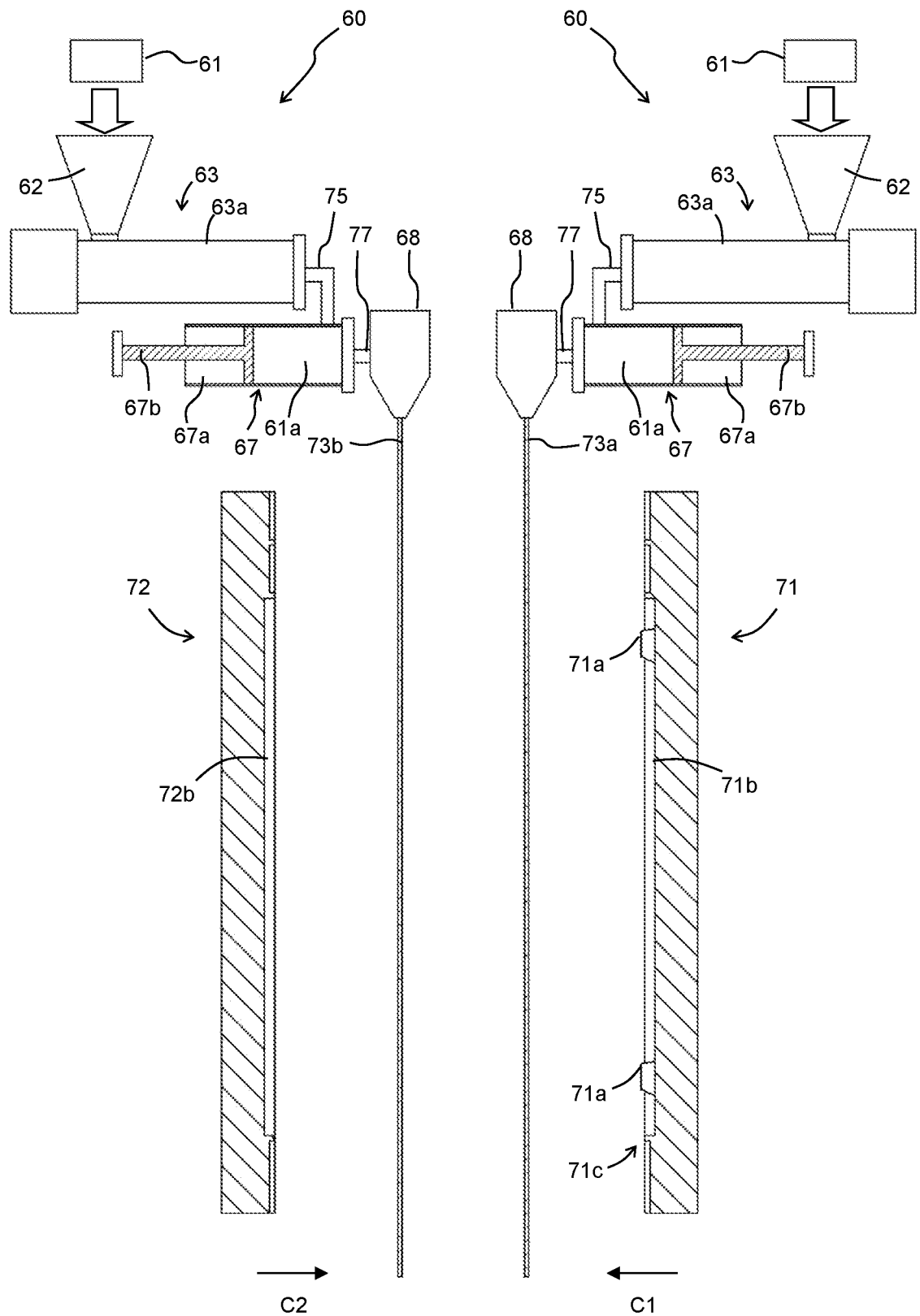
FIG. 3 is a diagram illustrating a manufacturing method of the resin panel 10.

In the hanging step, the resin sheets 73a, 73b formed by extruding and hanging down the molten resin 61a from the slit of the T-die 68 are hung down between the molds 71, 72, as shown in FIG. 3. In the present embodiment, direct vacuum molding is performed directly using the resin sheets 73a, 73b extruded from the T-die 68. Thus, the resin sheets 73a, 73b are not cooled to room temperature to be solidified before molding, and the solidified resin sheets 73a, 73b are not heated before molding.

1-3-2. Shaping Step

In the shaping step, the resin sheets 73a, 73b are suctioned under reduced pressure by the molds 71, 72 to shape the resin sheets 73a, 73b. In the mold 71, the resin sheet 73a is shaped along an outer shape of the inner surface 71b of the cavity. Here, since the truncated cone-shaped protrusion 71a is formed on the mold 71, the resin sheet 73a is shaped along the protrusion 71a, so that the tapered concave portion 2 is formed on the surface of the main body 1. When the resin sheet 73a is shaped along the protrusion 71a, the resin sheet 73a is stretched along a slope of the protrusion 71a, and the thickness of the wall surface 2a of the concave portion 2 on the main body 1 becomes smaller than the thickness of the surface 1a of the main body 1. The resin sheet 73b is shaped along the inner surface 72b of the cavity. The timing at which the resin sheets 73a, 73b are shaped may be different. For example, the resin sheet 73b may be shaped in a mold clamping step.

1-3-3. Mold Closing Step

In the mold closing step, the molds 71, 72 are closed by moving the molds 71, 72 in a direction of arrows C1, C2 in FIG. 3, respectively. Consequently, the main body 1 made of the resin molded body is formed between the molds 71, 72. Subsequently, the molds 71, 72 are separated, and the main body 1 molded between the molds 71, 72 is taken out. Since the protrusion 71a is formed in a truncated cone shape, the mold 71 and the main body 1 can be easily separated from each other.

1-3-4. Attaching Step

Figure 4A:
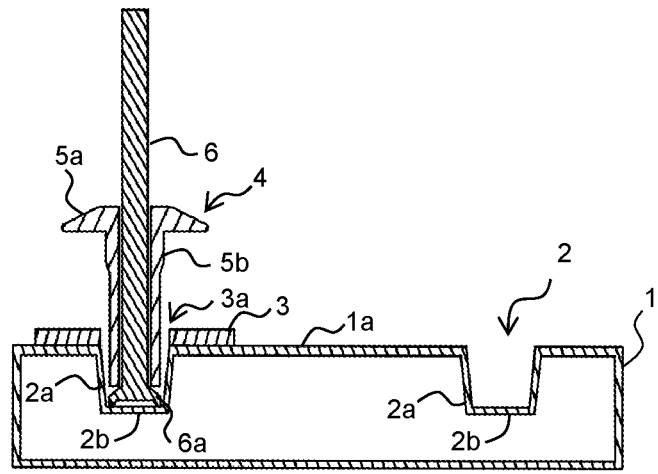
FIG. 4A to FIG. 4C are diagrams illustrating an attaching step in the manufacturing method of the resin panel 10.

In the attaching step, the attached member 3 is attached to the main body 1 molded by the above steps. First, as shown in FIG. 4A, the attached member 3 is arranged above the concave portion 2. Then, the blind rivet 4 is inserted through an insertion hole 3a previously formed on the attached member 3 and is arranged in the concave portion 2 so that the tip portion 6a of the shaft 6 comes into contact with a bottom portion 2b of the concave portion 2.

The ratio r1/r2 of the length r1 of the rivet body 5b in the radial direction to the diameter r2 of the bottom portion 2b is preferably 0.7 to 1.1. Specifically, r1/r2 may be, for example, 0.7, 0.8, 0.9, 1.0, 1.1 and may be in a range between any two of the values exemplified herein. If r1/r2 is too small, an enlarged tip of the rivet body 5b does not reach the wall surface 2a of the concave portion 2 when the rivet body 5b is torn and its diameter is enlarged by the tip portion 6a of the shaft 6. Further, if r1/r2 is too large, it becomes difficult to arrange the rivet body 5b in the concave portion 2.

The ratio L1/L2 of the length L1 of the rivet body 5b in the vertical direction to the depth L2 of the concave portion 2 is preferably 1.5 to 3.0. Specifically, the ratio may be, for example, 1.5, 1.6, 1.7, 1.8, 1.9, 2.0, 2.1, 2.2, 2.3, 2.4, 2.5, 2.6, 2.7, 2.8, 2.9, 3.0 and may be in a range between any two of the values exemplified herein. If L1/L2 is too small, the length of the part of the rivet body 5b penetrating the wall surface 2a of the concave portion 2 becomes short when the rivet body 5b is torn and its diameter is enlarged by the tip portion 6a of the shaft 6, and the attached member 3 is not sufficiently fixed. Further, if L1/L2 is too large, the diameter of the rivet body 5b is excessively enlarged, which may cause a problem where the tip of the rivet body 5b penetrates not only the wall surface 2a of the concave portion 2 but also the surface 1a of the main body 1.

Figure 4B:
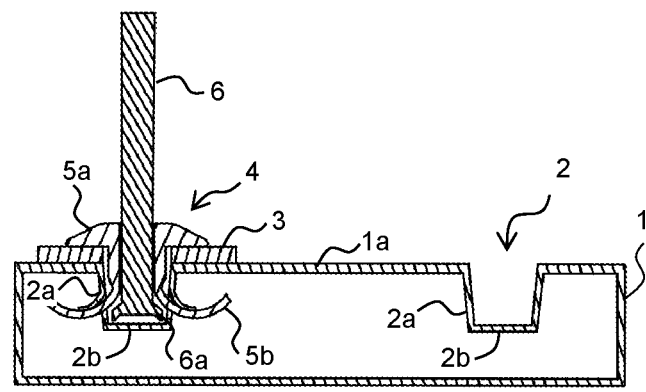

Next, the shaft 6 is pulled up while pushing down the rivet head 5a using a riveter (not shown). Consequently, as shown in FIG. 4B, the part of the rivet body 5b arranged in the concave portion 2 is torn by the tip portion 6a of the shaft 6 to enlarge its diameter and penetrates the wall surface 2a of the concave portion 2. Here, since the thickness of the wall surface 2a of the concave portion 2 is formed to be smaller than the thickness of the surface 1a of the main body 1, the rivet body 5b can easily penetrate the wall surface 2a.

Figure 4C:
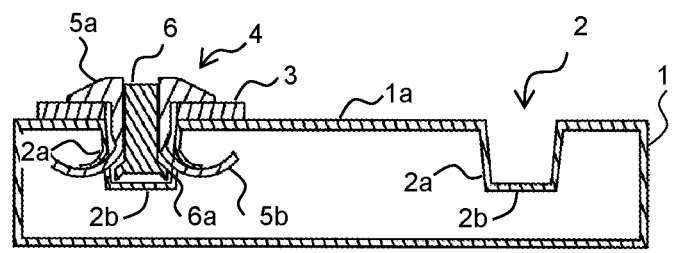

Next, an upper portion of the shaft 6 is torn, as shown in FIG. 4C, by further pulling up the shaft 6 using the rivet. Consequently, the attached member 3 is attached to the surface 1a of the main body 1 by the blind rivet 4, and the resin panel 10 is manufactured.

As described above, in the manufacturing method of the resin panel 10 according to the present embodiment, the part of the rivet body 5b provided on the blind rivet 4 is arranged in the concave portion 2 provided on the surface 1a of the main body 1, and the rivet body 5b is torn by the tip portion 6a of the shaft 6 to enlarge its diameter, so that the rivet body 5b penetrates the wall surface 2a of the concave portion 2 to attach the attached member 3 to the surface 1a.

Such a configuration eliminates the need to form an insertion hole for inserting the blind rivet 4 through the main body 1. Consequently, the work of removing cutting chips generated when the insertion hole is formed becomes unnecessary, and thus the man-hours can be reduced.

Here, the wall surface 2a of the concave portion 2 is formed in a tapered shape. This makes it easy to remove the mold 71 from the main body 1 in the mold closing step, and also makes it easy for the rivet body 5b, which has been torn and whose diameter has been enlarged in the attaching step, to penetrate the wall surface 2a.

2. Second Embodiment of First Viewpoint

Figure 5:
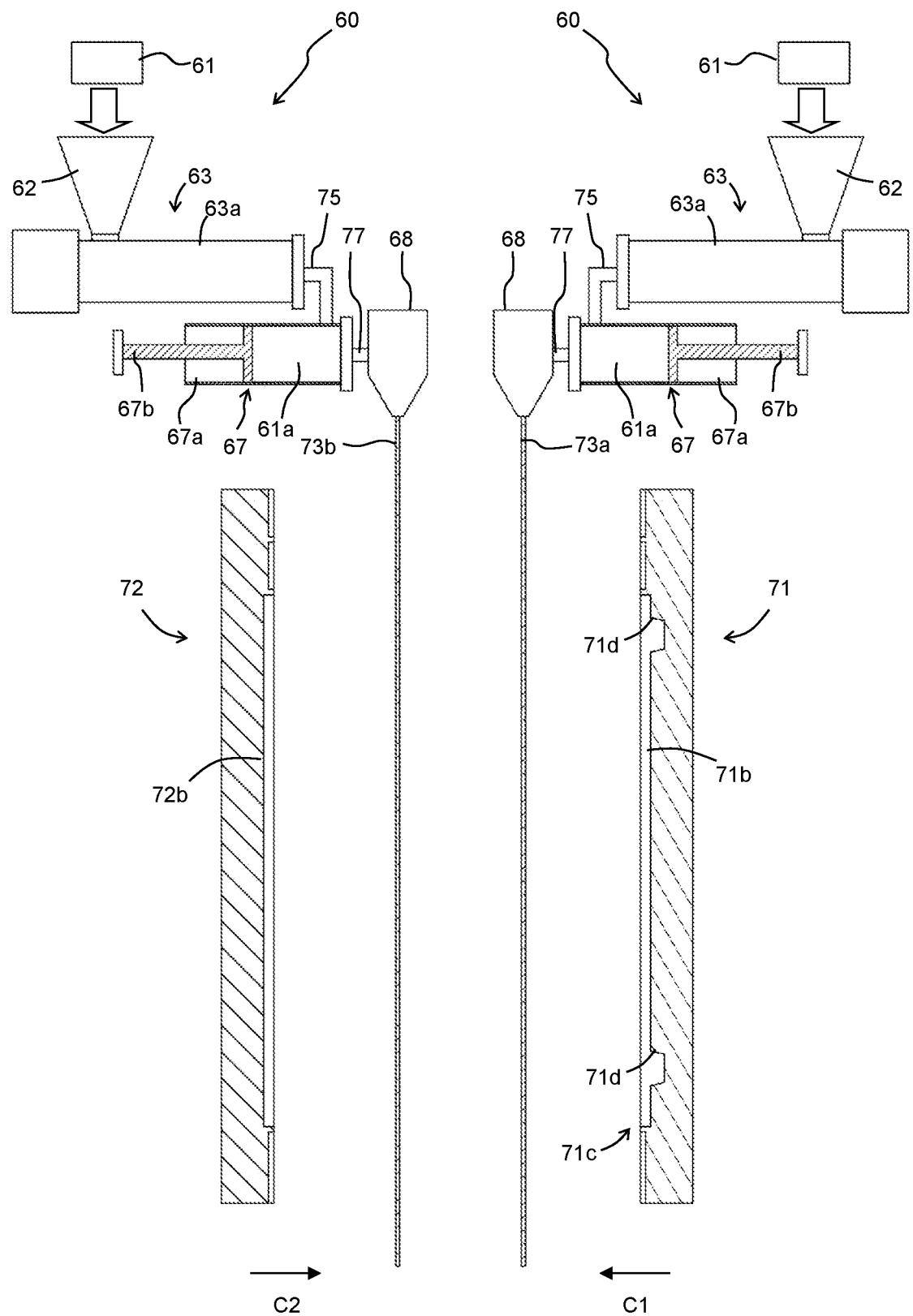
FIG. 5 is a diagram illustrating a manufacturing method of the resin panel 10 according to a second embodiment.

The manufacturing method of the resin panel 10 according to a second embodiment will be described. As shown in FIG. 5, the mold 71 used for manufacturing the resin panel 10 includes convex-portion forming portions 71d, which have a concave shape. Convex portions 7 are thus formed on the surface 1a of the main body 1 in the resin panel 10.

Figure 6A:
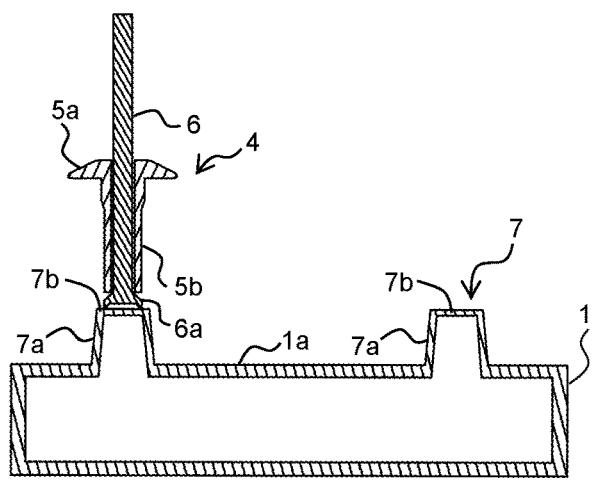
FIG. 6A to FIG. 6D are diagrams illustrating the attaching step in the manufacturing method of the resin panel 10.

The attaching step of the second embodiment will be described with reference to FIG. 6A and FIG. 6B. In the attaching step of the second embodiment, the blind rivet 4 is arranged on the convex portion 7, as shown in FIG. 6A, so that the tip portion 6a of the shaft 6 comes into contact with a top portion 7b of the convex portion 7.

Figure 6B:
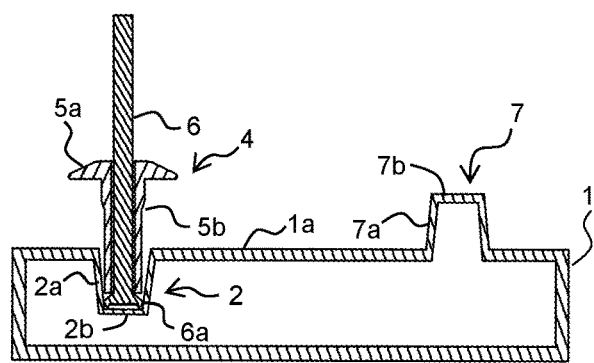
Figure 6C:
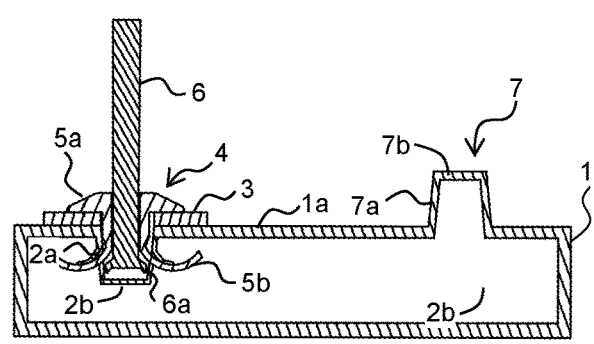
Figure 6D:
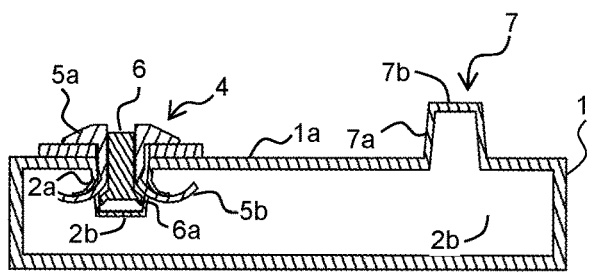

Next, as shown in FIG. 6B, the convex portion 7 is inverted to form the concave portion 2 by pressing the shaft 6 of the blind rivet 4 against the convex portion 7 (one example of the "concave-portion formation step"). Here, since a wall surface 7a of the convex portion 7 is formed thinner than the surface 1a, the convex portion 7 can be easily inverted by pressing the blind rivet 4 against it. Subsequently, as in the first embodiment, the rivet body 5b is torn using a riveter to enlarge its diameter and penetrate the wall surface 2a of the concave portion 2, so that the attached member 3 is attached to the surface 1a of the main body 1 (see FIG. 6C and FIG. 6D).

Even with such a configuration, the same effect as in the above embodiment can be obtained. In the second embodiment, the concave portion 2 is formed by inverting the convex portion 7 formed on the surface 1a of the main body 1. Therefore, since the convex portion 7 is formed at a portion where the attached member 3 is attached, it is possible to accurately recognize an attaching position of the attached member 3 without confusing it with the other concave portions 2 formed on the surface 1a of the main body 1.

Further, in the second embodiment, the convex portion 7 can be formed on the main body 1 by additionally providing the convex-portion forming portion 71d on the mold 71. This makes it possible to easily deal with design changes, such as changing the attaching position of the attached member 3 on the resin panel 10.

3. Other Embodiments of First Viewpoint

The application of the present invention is not limited to the above embodiments. For example, although the concave portion 2 is formed in a circular shape in a plan view in the above embodiments, the configuration is not limited to this example. For example, the concave portion 2 may be formed in a non-circular shape in a plan view.

If the concave portion 2 is formed to have a non-circular cross section, it is less likely that the rivet body 5b completely separates an opening side of the wall surface 2a from the bottom portion 2b when the rivet body 5b is torn to enlarge its diameter and penetrates the wall surface 2a of the concave portion 2 in the attaching step. Consequently, it is possible to prevent the problem of the bottom portion 2b falling into the main body 1 as a machining chip and causing work to remove the machining chip.

Figure 7A:
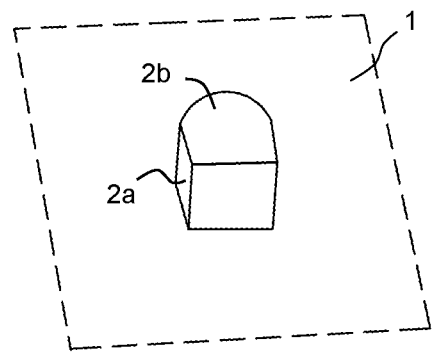
FIG. 7A to FIG. 7C are perspective views of a concave portion 2 in another embodiment of the first viewpoint as viewed from the inside of a main body 1.
Figure 7B:
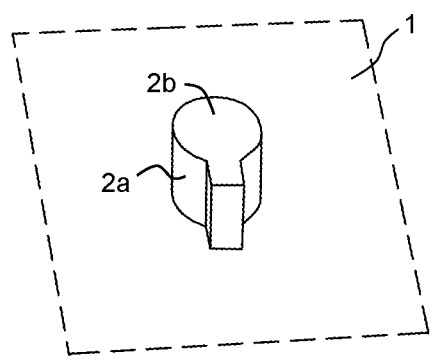
Figure 7C:
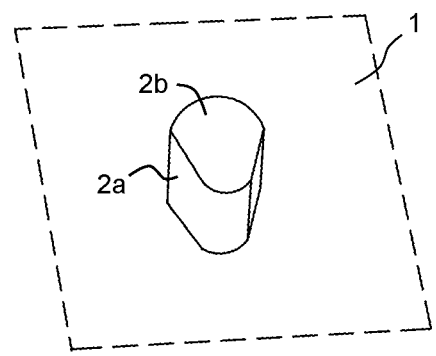

The specific shape of the concave portion 2 may be, for example, as shown in FIG. 7A to FIG. 7C. FIG. 7A to FIG. 7C are perspective views of the concave portion 2 from the inside of the main body 1. The concave portion 2 may have a shape of a combination of a semicircle and a rectangle in a plan view (see FIG. 7A) or may have a key shape of a combination of a part of a circle and a rectangle (see FIG. 7B). Alternatively, the concave portion 2 may have a shape in which two arcs of different sizes are connected via a straight line (see FIG. 7C).

Further, although the main body 1 is formed in a hollow shape, the configuration is not limited to this example. For example, the main body 1 may be molded to include a core material, such as foamed resin.

Further, although the molding step is performed using two resin sheets in the above embodiment, the configuration is not limited to this example. For example, the main body 1 may be molded by blow molding using a cylindrical parison.

Embodiments of Second Viewpoint

1. First Embodiment 1-1. Configuration of Structure 20

Figure 8A:
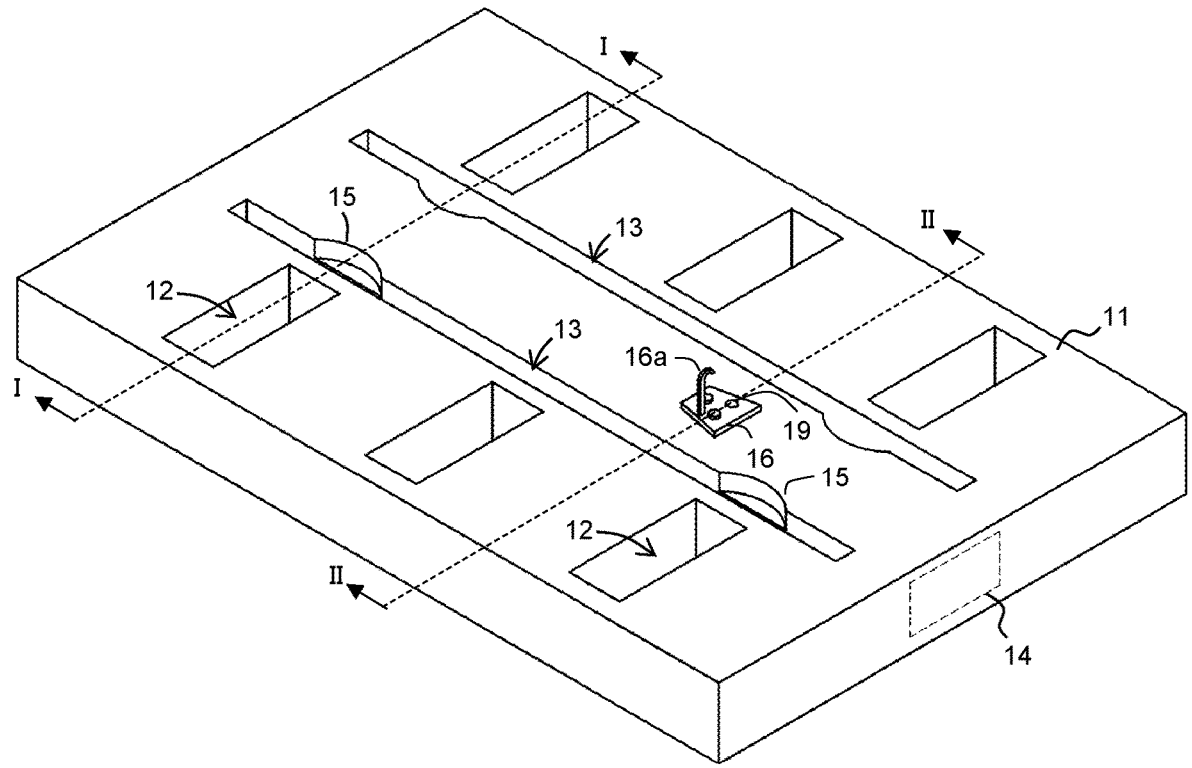
FIG. 8A is a perspective view of a structure 20 of a first embodiment of a second viewpoint of the present invention.
Figure 8B:
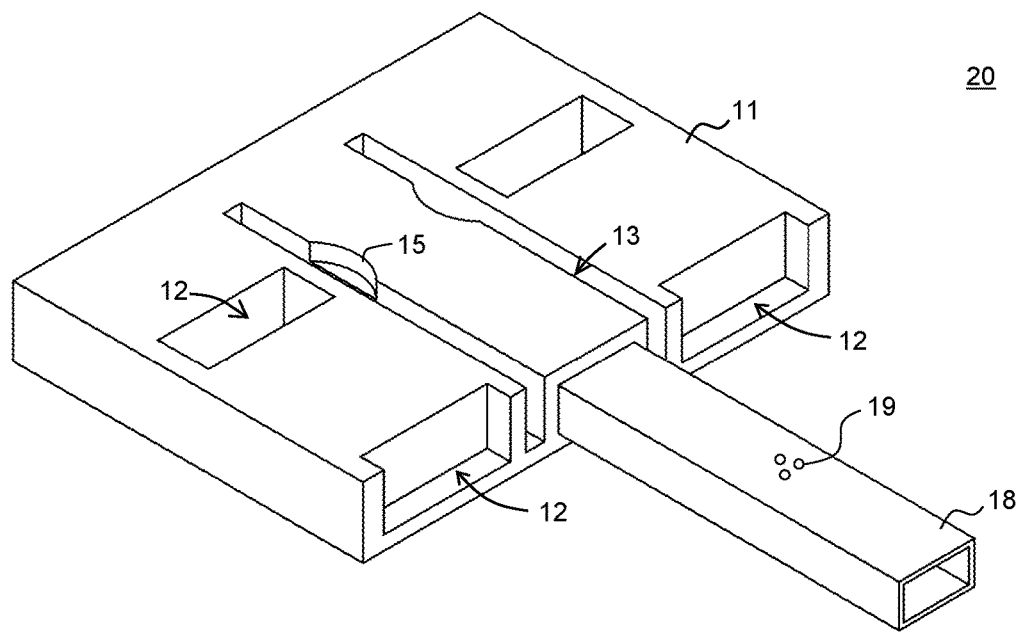
FIG. 8B is a diagram in which a part of FIG. 8A is omitted.

As shown in FIG. 8A and FIG. 8B, a structure 20 according to a first embodiment of the present invention is formed in a rectangular shape in a plan view. The structure 20 includes a resin molded body 11, a reinforcing material 18, an attached member 16, and a fixture 19. The structure 20 is used, for example, as a luggage board in a luggage compartment of a vehicle.

The resin molded body 11 has a hollow portion 17 inside (see FIG. 9A and FIG. 9B), and the elongated reinforcing material 18 is arranged inside the hollow portion 17 located in the center of the resin molded body 11 in the width direction (hereinafter, also simply referred to as the width direction). The reinforcing material 18 reinforces the structure 20. The reinforcing material 18 has a tubular shape having an opening at an end and may be made of metal, such as iron or aluminum, or a high-strength material, such as carbon fiber. Although the reinforcing material 18 has a tubular shape having a rectangular cross section in an example shown in FIG. 8B, the configuration is not limited to this example, and it may have, for example, a cylindrical shape.

The resin molded body 11 includes a rectangular rib 12 for reinforcement. As an example, the resin molded body 11 shown in FIG. 8A and FIG. 8B is provided with three rectangular ribs 12 in pairs (i.e., six in total) in the width direction of the resin molded body 11 at equal intervals along the longitudinal direction of the resin molded body 11 (hereinafter, also simply referred to as the longitudinal direction). The rectangular rib 12 is formed in a rectangular shape elongated in the width direction in a plan view.

Figure 9A:
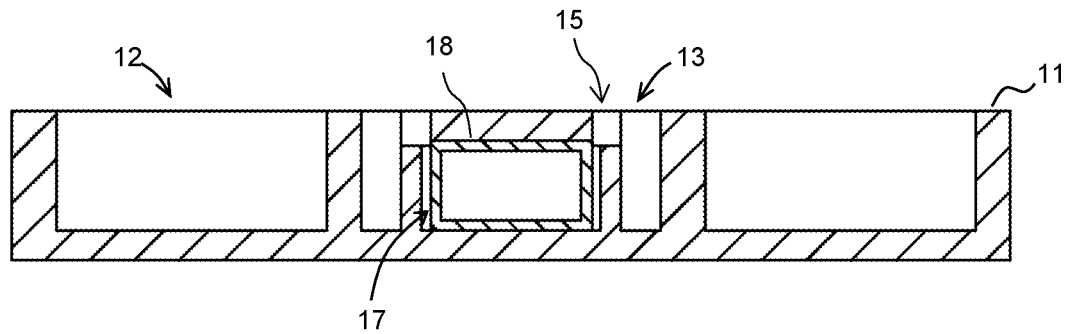
FIG. 9A is a cross-sectional view taken along a line I-I in FIG. 8A.

The resin molded body 11 is provided with an elongated rib 13 for positioning the reinforcing material 18 arranged in the hollow portion 17. A pair of elongated ribs 13 are provided, along the longitudinal direction of the resin molded body 11, on both sides of the hollow portion 17 where the reinforcing material 18 is arranged. A concave portion 15 is provided on a wall surface of the elongated rib 13 on a side of the reinforcing material 18, whereby the reinforcing material 18 arranged in the hollow portion 17 is positioned in the width direction, as shown in FIG. 9A.

At one end of the resin molded body 11 in the longitudinal direction, a non-woven fabric 14 is affixed to the center in the width direction. This is to close an opening 32 provided for inserting the reinforcing material 18 into the hollow portion 17. The insertion of the reinforcing material 18 will be described in detail later.

The attached member 16 is attached to an outer surface of the resin molded body 11 by the fixtures 19. The attached member 16 has a fixing hook 16a. When the structure 20 is arranged in a luggage compartment of a vehicle, the fixing hook 16a engages with a predetermined point of the luggage compartment, thereby fixing the structure 20 in the luggage compartment.

Figure 9B:
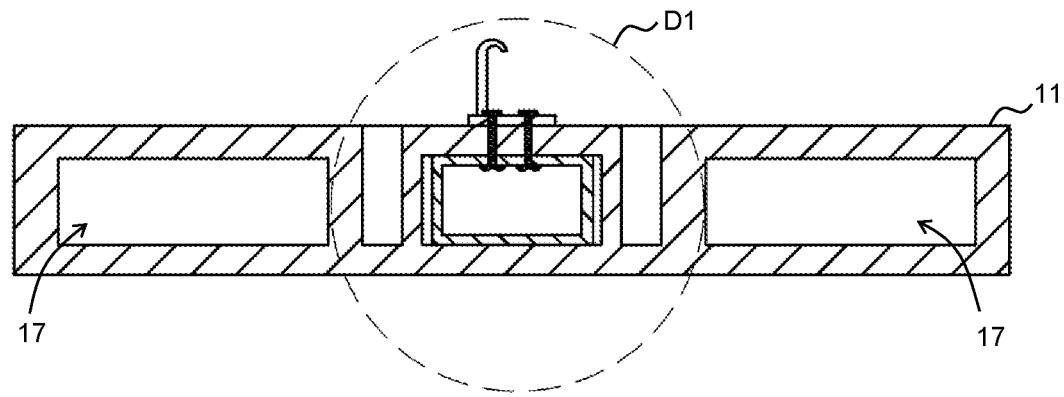
FIG. 9B is a cross-sectional view taken along a line II-II in FIG. 8A.
Figure 9C:
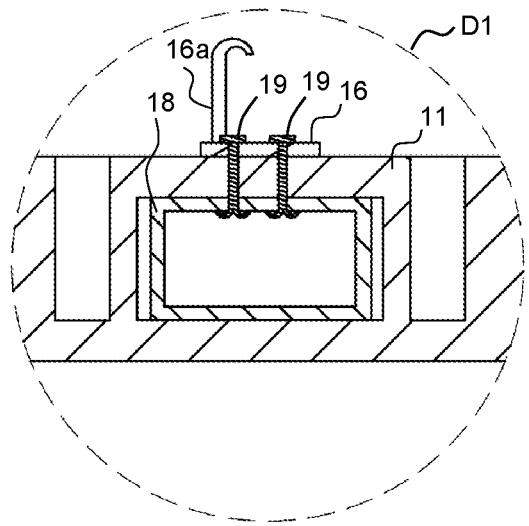
FIG. 9C is an enlarged view of a region D1 in FIG. 9B.

The fixture 19 penetrates and jointly fastens the attached member 16, the resin molded body 11, and the reinforcing material 18, as shown in FIG. 9B and FIG. 9C. Although a blind rivet is used as the fixture 19 in the present embodiment, the configuration is not limited to this example, and a screw bolt, a rivet and the like may be used. The attached member 16 is jointly fastened with the resin molded body 11 and the reinforcing material 18 by the fixture 19 attached to the outer surface of the resin molded body 11 in this way, and thus the attached member 16 can be securely attached to the resin molded body 11.

1-2. Manufacturing Method of Structure 20

Next, a manufacturing method of the structure 20 will be described with reference to FIG. 10 to FIG. 14B. The method of the present embodiment includes a molding step, an opening step, an insertion step, an attaching step, and a discharging step.

(1) Molding Step

The molding step is a step for molding the resin molded body 11 and includes, as an example, a hanging step, a shaping step, and a mold closing step.

(1-1) Hanging Step

Figure 10:
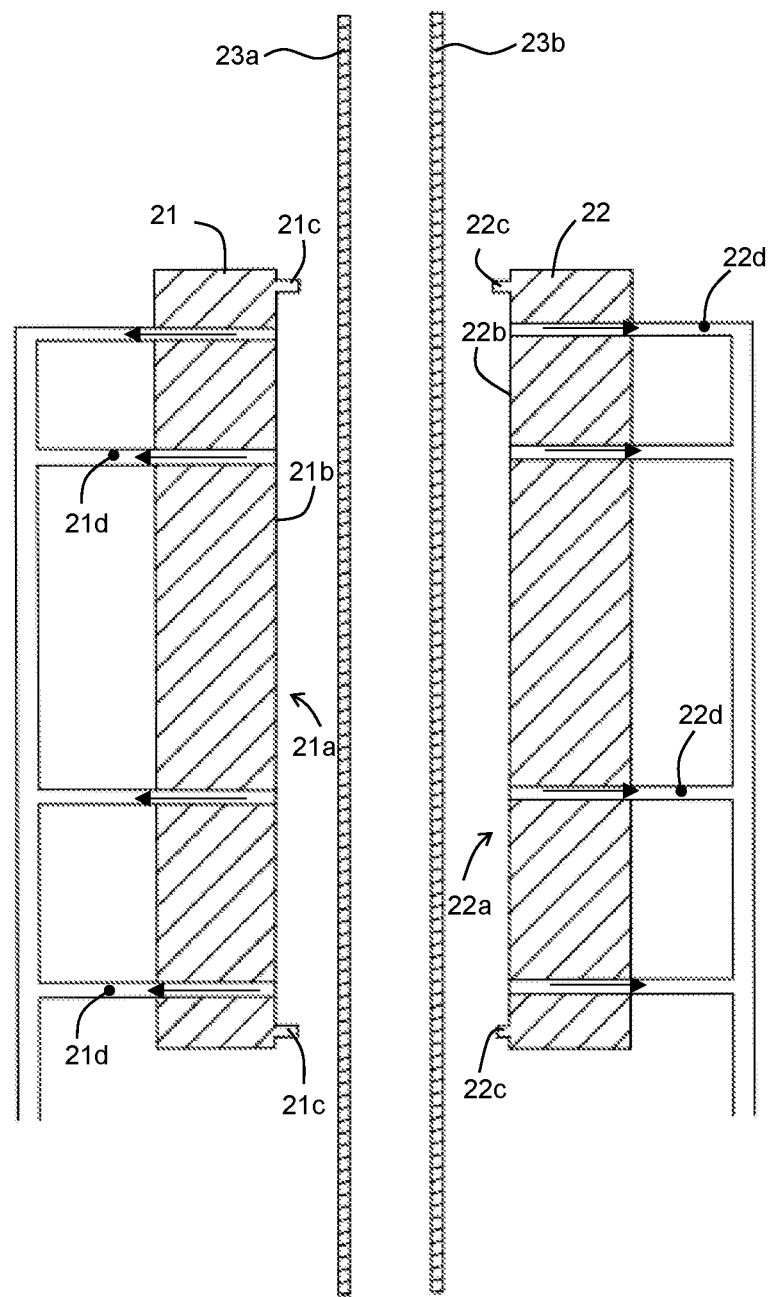
FIG. 10 is a diagram illustrating a hanging step and a shaping step when a resin molded body 11 is manufactured.

In the hanging step, resin sheets 23a, 23b are hung down between molds 21, 22, as shown in FIG. 10. In the present embodiment, direct reduced pressure molding is performed directly using the resin sheets 23a, 23b extruded from the T-die 68. Thus, the resin sheets 23a, 23b are not cooled to room temperature to be solidified before molding, and the solidified resin sheets 23a, 23b are not heated before molding.

(1-2) Shaping Step

In the shaping step, as shown in FIG. 10, the resin sheet 23a is suctioned under reduced pressure via reduced pressure suction holes 21d and is molded by the mold 21 along an inner surface 21b of a cavity 21a of the mold 21, and the resin sheet 23b is suctioned under reduced pressure via reduced pressure suction holes 22d and is molded by the mold 22 along an inner surface 22b of a cavity 22a of the mold 22. The timing at which the resin sheets 23a, 23b are shaped may be different. For example, the resin sheet 23b may be shaped in the mold closing step.

(1-3) Mold Closing Step

Figure 11:
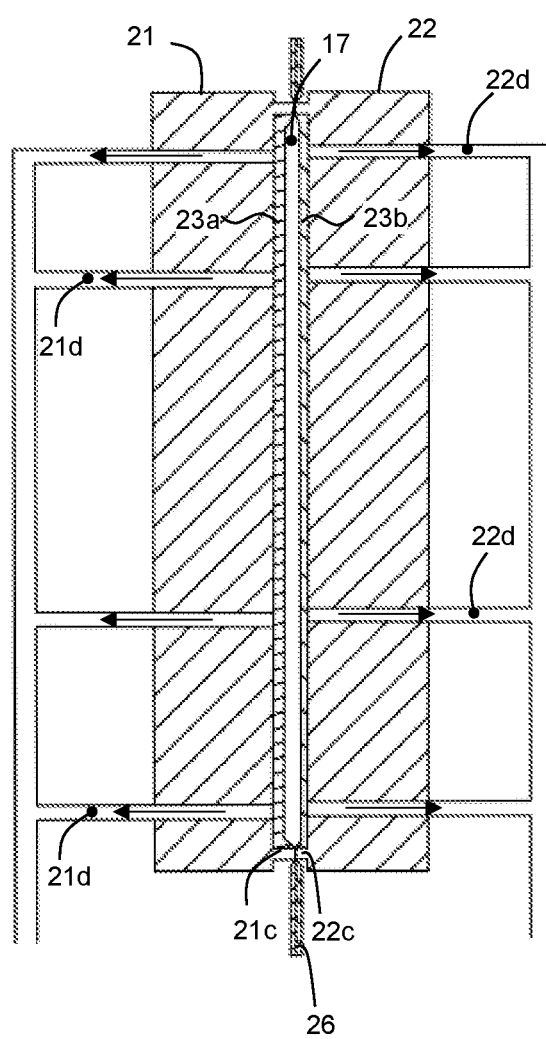
FIG. 11 is a diagram illustrating a mold closing step when the resin molded body 11 is manufactured.

In the mold closing step, the molds 21, 22 are closed, as shown in FIG. 11. Consequently, the resin sheets 23a, 23b are welded to each other in an area adjacent to pinch-off portions 21c, 22c. Further, the hollow portion 17 is formed between the resin sheets 23a, 23b.

Next, a molded body is taken out from the molds 21, 22, and a burr 26 on the outside of the pinch-off portions 21c, 22c is removed to obtain the resin molded body 11 having the hollow portion 17.

(2) Opening Step

Figure 12A:
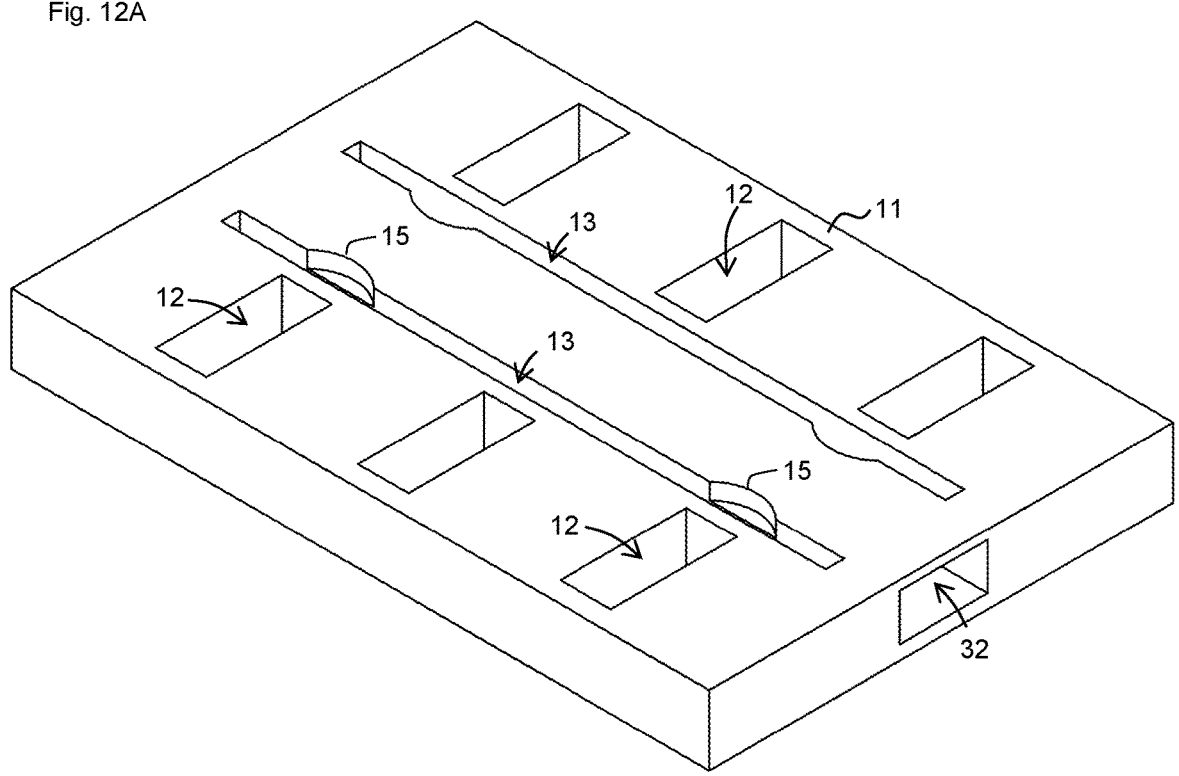
FIG. 12A is a diagram illustrating an opening step in a manufacturing method of the structure 20.

Next, the opening step is performed on the resin molded body 11 obtained in the above molding step. In the opening step, as shown in FIG. 12A, the opening 32 communicating with the hollow portion 17 located in the center of the resin molded body 11 in the width direction is formed at an end of the resin molded body 11.

(3) Insertion Step

Figure 12B:
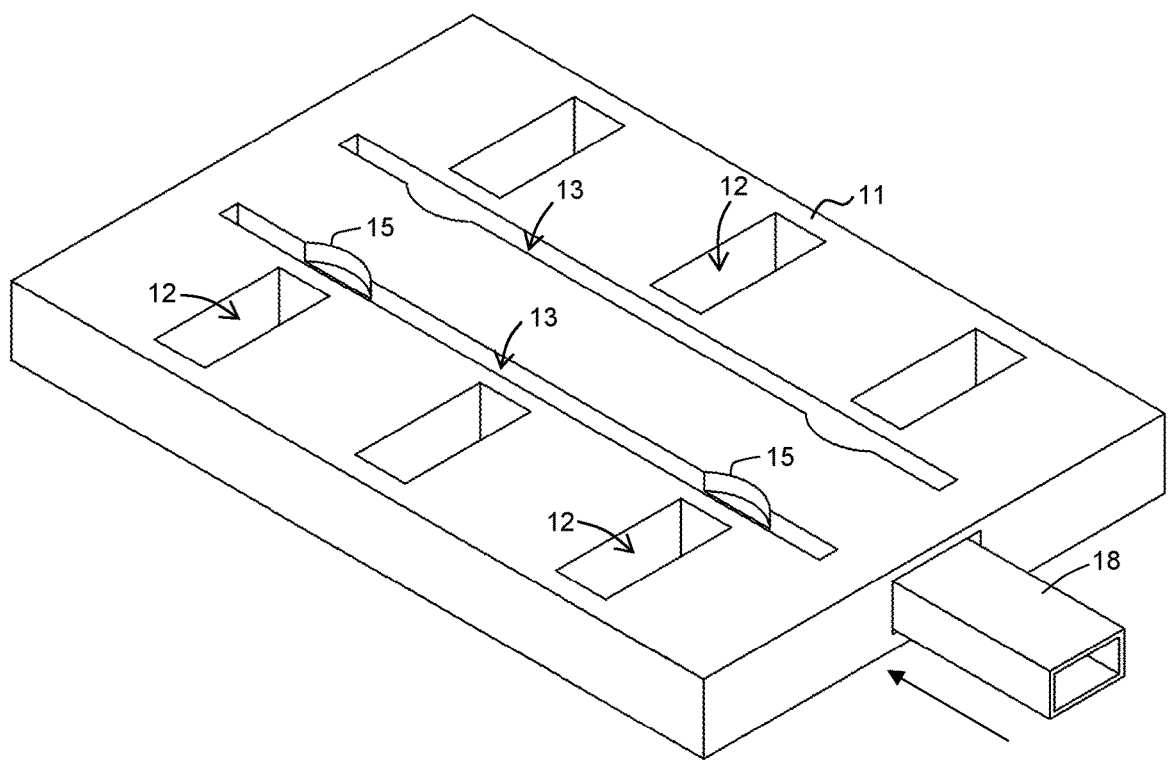
FIG. 12B is a diagram illustrating an insertion step in the manufacturing method of the structure 20.

Next, the insertion step is performed on the resin molded body 11 provided with the opening 32. In the insertion step, as shown in FIG. 12B, the tubular reinforcing material 18 is inserted into the hollow portion 17 from the opening 32.

(4) Attaching Step

Figure 13A:
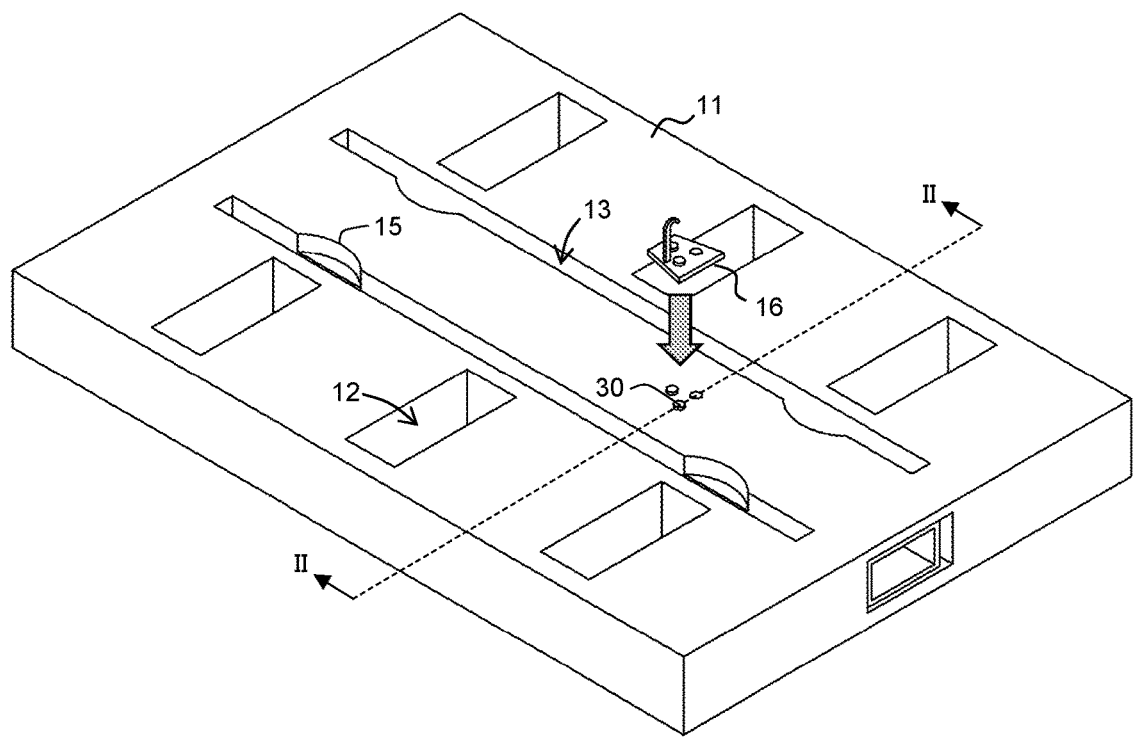
FIG. 13A is a diagram illustrating an attaching step in the manufacturing method of the structure 20.
Figure 13B:
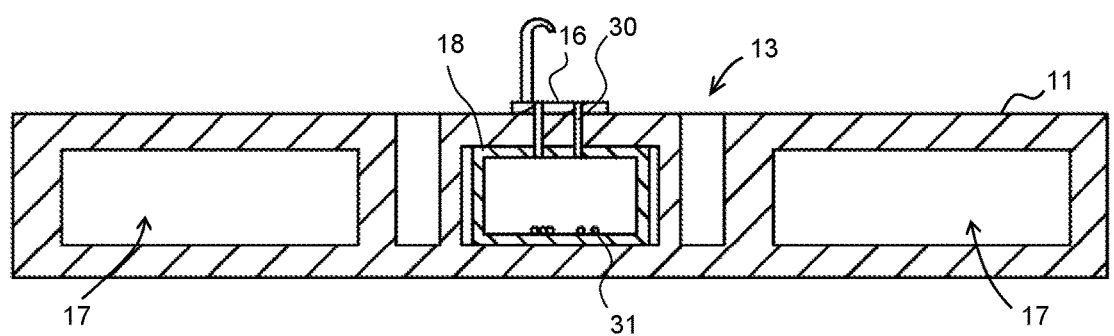
FIG. 13B is a cross-sectional view taken along a line II-II in FIG. 13A.

Next, the attaching step is performed on the resin molded body 11 in which the reinforcing material 18 is inserted into the hollow portion 17. In the attaching step, first, the resin molded body 11 and the reinforcing material 18 are cut to form through holes 30, as shown in FIG. 13A and FIG. 13B. At this time, as shown in FIG. 13B, cutting chips 31 are generated inside the reinforcing material 18 arranged in the hollow portion 17. In this regard, although through holes are provided beforehand on the attached member 16 in the present embodiment, the through holes may be formed at the same time as the resin molded body 11 and the reinforcing material 18. Then, the attached member 16 is attached to the outer surface of the resin molded body 11 with the fixture 19 so as to jointly fasten the resin molded body 11 and the reinforcing material 18 arranged in the hollow portion 17 (see FIG. 9B and FIG. 9C).

(5) Discharging Process

Figure 14A:
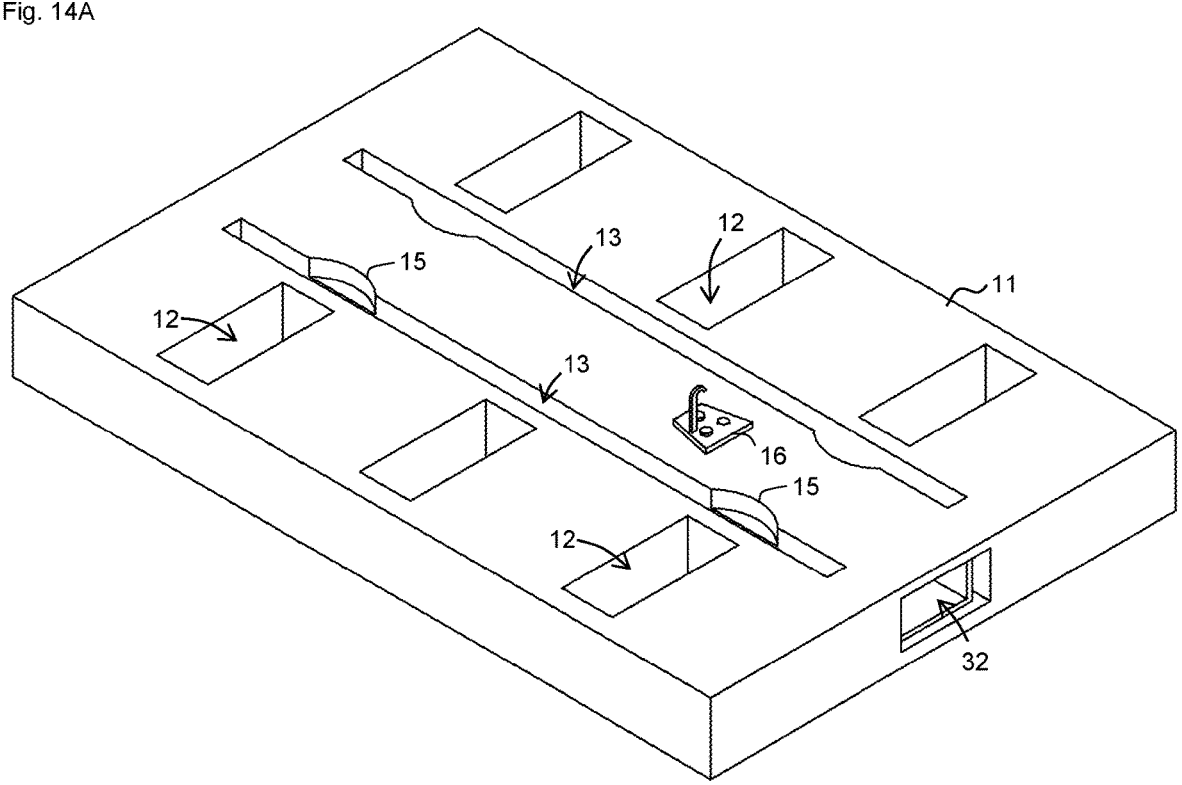
FIG. 14A is a diagram illustrating the attaching step in the manufacturing method of the structure 20.
Figure 14B:
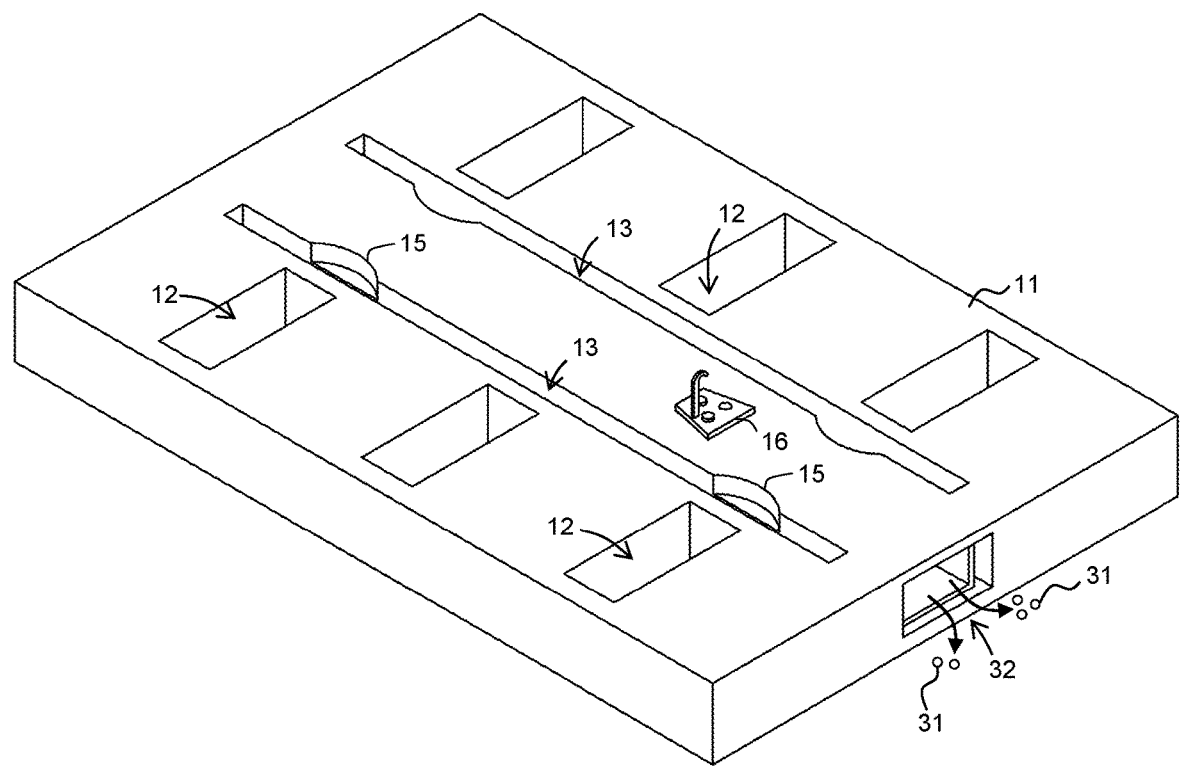
FIG. 14B is a diagram illustrating a discharging step in the manufacturing method of the structure 20.

Next, the discharging step is performed on the resin molded body 11 to which the attached member 16 is attached, as shown in FIG. 14A. In the discharging step, the cutting chips 31 generated during cutting in the attaching step are discharged through the opening 32 formed at the end of the resin molded body 11, as shown in FIG. 14B. The cutting chips 31 are discharged from the hollow portion 17 along the longitudinal direction of the reinforcing material 18. Then, the non-woven fabric 14 (see FIG. 8A) is affixed to the opening 32 to obtain the structure 20.

As described above, in the manufacturing method of the structure 20 according to the present embodiment, after the reinforcing material is inserted into the hollow portion 17 of the resin molded body 11, the resin molded body 11 and the reinforcing material 18 are cut to form the through holes 30. The fixture 19 is then inserted through the through hole 30 to jointly fasten the resin molded body 11 and the reinforcing material 18, so that the attached member 16 is attached to the outer surface of the resin molded body 11 by the fixture 19. Then, the cutting chips 31 generated during cutting are discharged from the hollow portion 17 along the longitudinal direction of the reinforcing material 18.

Such a method enables the attached member 16 to be securely attached to the outer surface of the resin molded body 11 and also enables the cutting chips 31 generated during attachment to be smoothly discharged from the hollow portion 17. This prevents problems, such as the generation of abnormal noise due to the cutting chips 31 remaining in the hollow portion 17. In this regard, although an inner surface of the hollow portion 17 may be rough when glass fiber or the like is contained in the material of the resin molded body 11, the smooth discharge of the cutting chips 31 can be particularly facilitated because the reinforcing material 18 has a tubular shape.

2. Other Embodiments of Second Viewpoint

The application of the present invention is not limited to the above embodiments. For example, although the reinforcing material 18 is inserted, after the molding step, from the opening 32 formed on the resin molded body 11, the configuration is not limited to this example. For example, the molding step may include an insertion step of inserting the reinforcing material 18 into the resin molded body 11, and the mold closing step may be performed after inserting the reinforcing material 18 between the molds 21, 22.

Further, although the reinforcing material 18 has a tubular shape in the above embodiment, the configuration is not limited to this example. For example, if the inner surface of the hollow portion 17 is not rough, a reinforcing material having an H-shaped cross section may be used.

Further, although the resin molded body 11 and the reinforcing material 18 are cut to form the through hole in the above embodiment, the attached member 16 may be attached to the outer surface of the resin molded body 11 so as to jointly fasten the resin molded body 11 and the reinforcing material 18 without forming the through hole if the thickness of the reinforcing material 18 is large. In this case, the cutting chips 31 are not generated in the hollow portion 17, and thus it is not necessary to perform the above discharging step.

Further, although the molding step is performed using two resin sheets in the above embodiment, the configuration is not limited to this example. For example, the resin molded body 11 may be molded by blow molding using a cylindrical parison.

While various embodiments according to the present invention have been described, these are presented as examples and are not intended to limit the scope of the invention. The novel embodiment can be implemented in various other forms, and various omissions, replacements, and changes can be made without departing from the scope of the invention. The embodiments and the modifications thereof are included in the scope and gist of the invention and are included in the invention described in the claims and the equivalents thereof.

REFERENCE SIGNS LIST

1: main body, 1a: surface, 2: concave portion, 2a: wall surface, 2b: bottom portion, 3: attached member, 3a: insertion hole, 4: blind rivet, 5a: rivet body, 5b: rivet head, 6: shaft, 6a: tip portion, 7: convex portion, 7a: wall surface, 7b: top portion, 10: resin panel, 11: resin molded body, 12: rectangular rib, 13: elongated rib, 14: non-woven fabric, 15: concave portion, 16: attached member, 16a: fixing hook, 17: hollow portion, 18: reinforcing material, 19: fixture, 20: structure, 21, 22: mold, 21a, 22a: cavity, 21b, 22b: inner surface, 21c, 22c: pinch-off portion, 21d, 22d: reduced pressure suction hole, 23a, 23b: resin sheet, 25: connecting tube, 26: burr, 27: connecting tube, 30: through hole, 31: cutting chip, 32: opening, 60: molding machine, 61: raw material resin, 61a: molten resin, 62: hopper, 63: extruder, 63a: cylinder, 67: accumulator, 67a: cylinder, 67b: piston, 68: T-die, 71: mold, 71a: protrusion, 71b: inner surface, 71c: pinch-off portion, 71d: convex-portion forming portion, 72: mold, 72b: inner surface, 72c: pinch-off portion, 73a: first resin sheet, 73b: second resin sheet, 75, 77: connecting tube

The invention claimed is:

1. A manufacturing method of a resin panel, comprising:
an attaching step,
wherein, in the attaching step, an attached member is attached to a surface of a resin molded body by arranging a rivet body provided on a blind rivet in a concave portion formed on the surface, the concave portion having a wall surface tapered to have a smaller diameter toward a bottom surface, tearing a part of the rivet body to enlarge a diameter of the part of the rivet body, and allowing the part of the rivet body to penetrate a wall surface of the concave portion,
wherein a ratio L1/L2 of a length L1 of the rivet body in a vertical direction to a depth L2 of the concave portion is 1.5 to 3.0, and
wherein an inner surface of the wall surface of the concave portion is tapered prior to enlarging the diameter of the part of the rivet body.

2. The method of claim 1, wherein the concave portion has a truncated cone shape, and
in the attaching step, the attached member is attached to the surface by tearing the part of the rivet body to enlarge the diameter of the part of the rivet body and allowing the part of the rivet body to penetrate the wall surface in a tapered shape.

3. The method of claim 1, wherein the attaching step further comprises a concave-portion formation step of forming the concave portion by pressing the blind rivet against a convex portion formed on the surface and inverting the convex portion.

4. The method of claim 1, wherein the concave portion is formed on the surface of the resin molded body to have a non-circular shape in a plan view.

5. A manufacturing method of a resin panel, comprising:
an attaching step,
wherein, in the attaching step, an attached member is attached to a surface of a resin molded body by arranging a rivet body provided on a blind rivet in a concave portion formed on the surface, tearing a part of the rivet body to enlarge a diameter of the part of the rivet body, and allowing the part of the rivet body to penetrate a wall surface of the concave portion;
wherein the attaching step further comprises a concave-portion formation step of forming the concave portion by pressing the blind rivet against a convex portion formed on the surface and inverting the convex portion.

* * * * *